J. C. BAREISS.
PIPE AND TUBE TESTER.
APPLICATION FILED FEB. 17, 1920.
1,422,522.
Patented July 11, 1922.
3 SHEETS—SHEET 3.
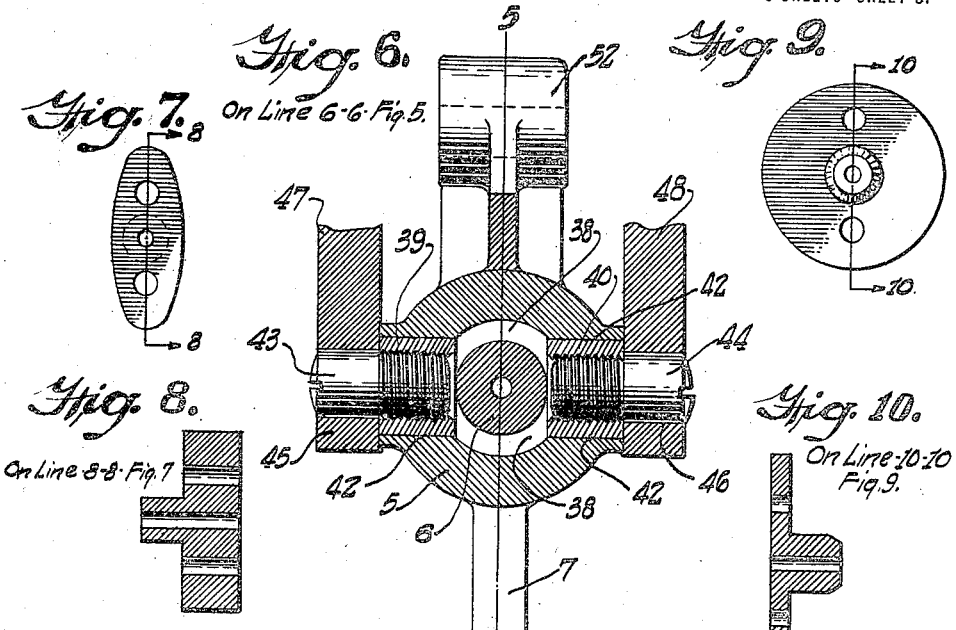
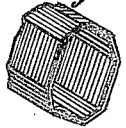
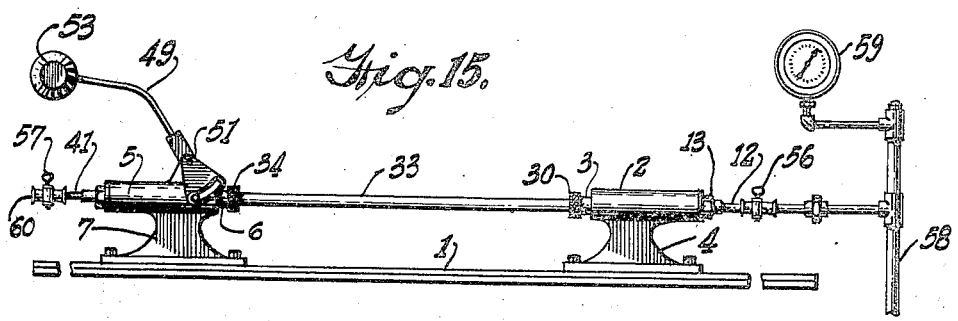
INVENTOR:
John Charles Bareiss.
BY
Diedersheim & Fairbanks.
ATTORNEYS.

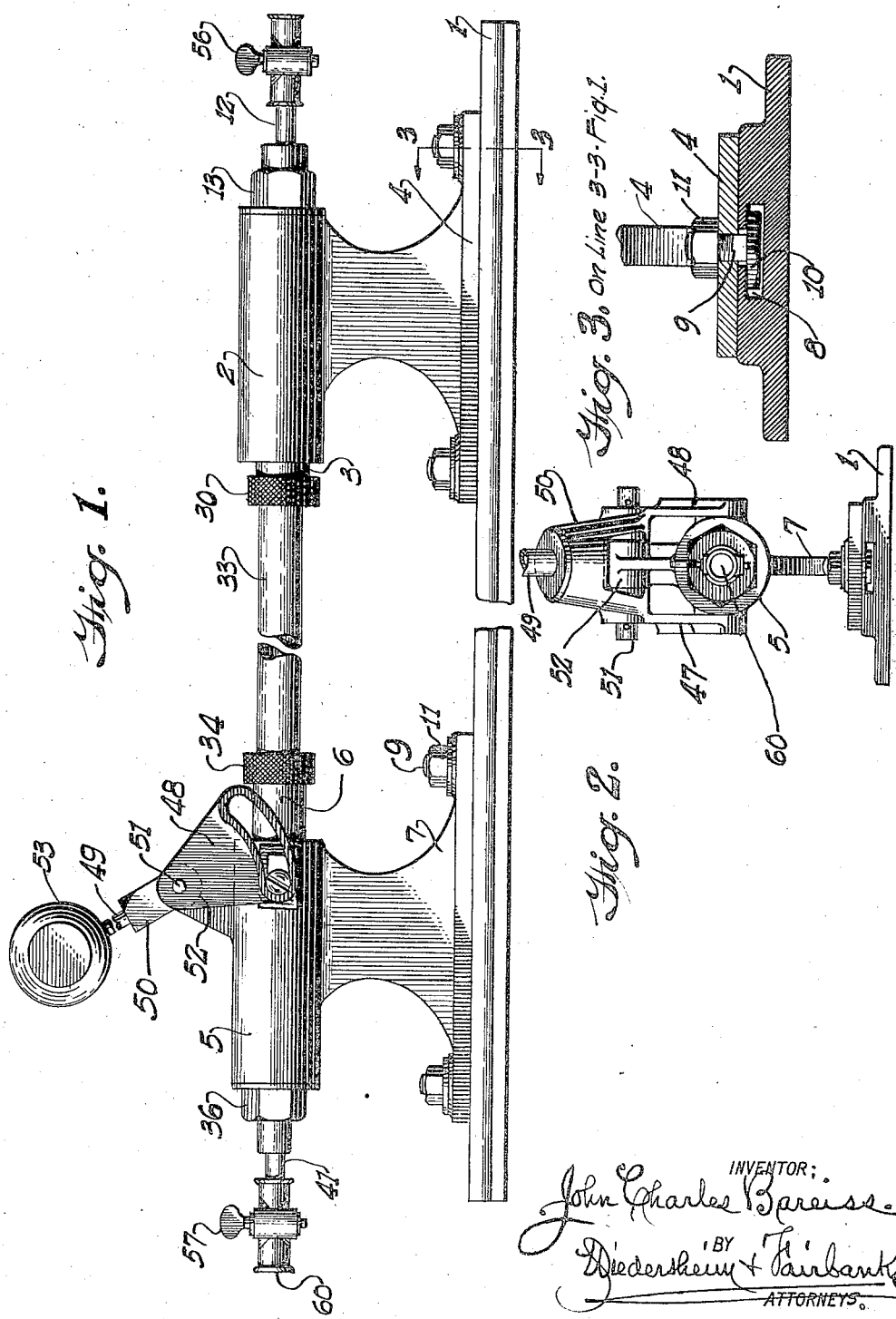

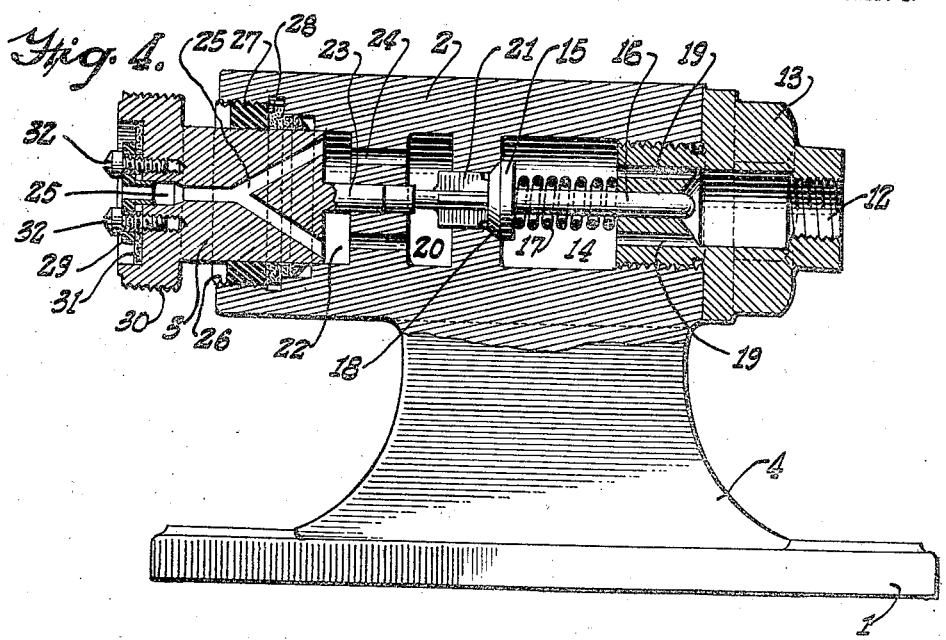
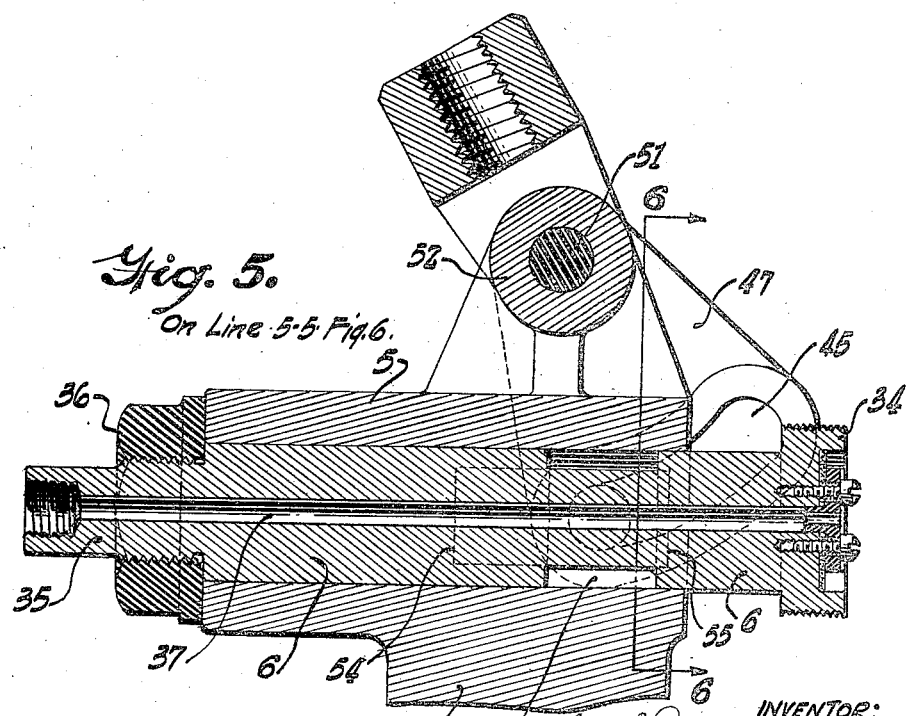

UNITED STATES PATENT OFFICE.

JOHN CHARLES BAREISS, OF PHILADELPHIA, PENNSYLVANIA.

PIPE AND TUBE TESTER.

1,422,522.          Specification of Letters Patent.          Patented July 11, 1922.

Application filed February 17, 1920. Serial No. 359,401.

*To all whom it may concern:*

Be it known that I, JOHN CHARLES BAREISS, a citizen of the United States, residing in the city and county of Philadelphia, State of Pennsylvania, have invented a new and useful Pipe and Tube Tester, of which the following is a specification.

My invention relates to the general class of devices which are employed to test the strength of metallic pipes or tubes made out of any particular metal and manufactured in any particular way, that is to say, by either the butt-weld or the lap-weld process, the maximum strain of which it is desired to test.

The object of my invention is the construction of a testing machine adapted to subject to test tubes of different lengths, of different diameters and of different sectional formations.

My invention comprehends in its broad and generic scope novel mechanism for clamping a tube, of any desired formation in cross section, in testing position, and novel means for simultaneously with such clamping action effecting the opening of a valve to permit the fluid under a predetermined pressure to pass into the tube to be tested.

It further comprehends a novel tube clamping means which will permit the manual rotation of the tube in order that the operator can readily see whether the tube has resisted the predetermined test pressure.

My invention further comprehends a novel construction and arrangement of a valve mechanism which is automatically actuated when a tube is clamped in testing position or released therefrom.

It further comprehends a novel construction of clamping members and novel means for supporting them.

My invention further comprehends mechanism of the general character illustrated in the accompanying drawings and hereinafter described, the special constructions and assemblages of elements which I prefer to employ and in which my invention resides being definitely set forth in the claims.

For the purpose of illustrating my invention, I have shown in the accompanying drawings one embodiment of it which is at present preferred by me because in practice it has given satisfactory and reliable results.

It is to be understood, however, that the various instrumentalities in which my invention is shown as embodied is not, therefore, limited to the precise arrangement and organization of the instrumentalities which are typified in the construction shown in the drawings and hereinafter described.

Figure 1 represents in side elevation a tube testing machine embodying my invention.

Figure 2 represents an end view of the machine and of one of the tube holders and its adjuncts.

Figure 3 represents a section on line 3—3 of Figure 1.

Figure 4 represents a central, vertical, longitudinal elevation through the right-hand casing, the right-hand tube holder, the valve and its adjuncts which in the preferred organization of my invention I employ.

Figure 5 represents a similar view of the left-hand casing, the left-hand tube holder and a lever or crank means for occasioning the desired end for end movement of the tube holder within the casing.

Figure 6 represents a section on line 6—6 of Figure 5.

Figure 7 represents an end elevation of a tube guide of elliptical formation employed in fastening into the machine a tube of elliptical cross section such for instance as is typified in Figure 12.

Figure 8 represents a section on line 8—8 of Figure 7.

Figure 9 represents in end elevation a tube guide of circular formation such as for instance is used in the mounting of a circular tube such as shown in Figure 11.

Figure 10 represents a central, sectional, side elevation on line 10—10 of Figure 9.

Figures 11, 12, 13 and 14 represent fragmentary ends of tubes respectively of circular, elliptical, quadrangular and polygonal cross sectional contour.

Figure 15 represents a side elevation of my machine with a tube to be tested in place.

Similar numerals of reference indicate corresponding parts.

Referring to the drawings.

1 designates a base upon which the machine as an entirety rests and which is of any desired length and upon which are mounted for longitudinal movement with relation one to the other two casings, in the drawings, a right-hand casing 2 and a left-hand casing 5 which relatively contain the devices which support between them the tube to be tested and which are technically called the tube holders and which have a relative movement upon the base from and toward each other so that between them may be inserted tubes of different lengths.

These casings 2 and 5 are essentially counter-part, in that each is supported by a body designated 4 for the casing 2, and 7 for the casing 5, and each mounted in a similar way upon the base so that they can be similarly moved toward and from each other and similarly fastened in desired relative positions.

Each of these casings, however, contains within it different devices which together are employed in holding the tube and subjecting it to the operation of being tested.

Referring first to the right-hand casing 2, best seen in Figure 4, it contains the valve control by means of which the testing fluid, whatever it may be, is controlled in its entrance into the tube.

This casing 2 which is conveniently externally cylindric and horizontally disposed, is erected upon a supporting body 4, see both Figures 3 and 4, and is broadened at its base to rest and travel longitudinally upon the base 1 of the machine, a connection between said body 4 and its base being conveniently made by means of bolts 9, the heads 10 of which travel within a longitudinal slot 8 in the base 1 and are adapted to be fastened tightly in any desired position by nuts 11.

This means of permitting the longitudinal movement of the two casings, 2 and 5, is preferably the same for each casing, the casing 5 which is the left-hand casing, hereinafter to be described, being supported upon a body 7 which corresponds to the body 4 and rests and travels upon the base 1 in the same way as the right-hand casing 2.

The casing 5 carries the left-hand tube holder 6 illustrated particularly in Figure 5 and later on described.

Into the outer end of the right-hand casing 2 which carries the right-hand tube holder 3, opens the pressure inlet 12 through which the testing medium enters the machine passing through the casing 2, the right-hand tube holder 3, the tube 33 to be tested, see Figure 15, the left-hand tube holder 6 and the pressure outlet, as will be understood.

13 designates a hollow nut by means of which the pressure enters the inlet 12, thus entering the casing 2.

14 designates a valve chamber, preferably cylindric, within the casing 2 within which is contained a valve 15 upon a valve stem 16 encircled by a valve spring 17 to normally hold the valve against its seat 18.

19 designates inlet ports through the nut 13 leading from the inlet aperture 12 through an extension of the nut 13 into the valve chamber 14.

20 is what I term a spindle chamber so formed as to retain within it a spindle 21 which is in alignment with and in communication with a chamber 22 into which is entered the right-hand tube holder 3.

23 designates a stem abutting against one end of the spindle 21 and connected to the inner end of the tube holder 3.

24 are ports communicating with the spindle chamber 20 and with the tube holder chamber 22.

The right-hand tube holder 3 is a preferably cylindrical body rotatably mounted in and having longitudinal movement within the chamber 22 and extending externally of the casing 2 and formed or provided with a recessed head 30 having a passage or port 25 axial as to a part of its length and then diverging and opening into the chamber 22.

26 designates a cylindric socket in the casing 2, into the threaded interior of which is entered and adapted to be turned externally a threaded annular lock nut 27 to compress a packing 28 to prevent leakage around the tube holder 3 which it is to be understood is capable of manual rotation and to this end the exterior of its head 30 is preferably, knurled.

29 is an apertured tube guide having a head of a preferred external outline, as indicated in Figures 7 and 9, which is held against a packing 31 by means of the fastening screws 32.

Inasmuch as the left-hand tube holder 6 has a recessed head which is a counterpart of the head 30, it is to be understood that the tube guide 29 under the description as being screwed to the right-hand head 30, is a counterpart of a similar guide applied to the left-hand head, a description of one will suffice for both. In order to equip the machine to hold and subject to test tubes of different forms as for instance circular as in Figure 11, elliptical as in Figure 12, squared as in Figure 13, or polygonal as in Figure 14, each guide is essentially of a form the outline of the head of which will correspond to the internal configuration of the particular form of tube to be tested, and each oppositely disposed and counterpart guide of the right hand tube holder and the left-hand tube holder will be adapted to be secured within the recessed head of its tube holder by fastening screws as illustrated in Figures 4 and 5.

In Figures 7 and 8 are illustrated an elliptical tube guide adapted to retain such an elliptical tube as represented in Figure 12, while in Figures 9 and 10 are represented a circular guide adapted to retain a circular tube such as is typified in Figure 11.

In order to secure tubes of other desired formation than elliptical or circular it is only necessary to form the head of the guide to conform to the interior form of the tube to be held in place.

From the foregoing description of the right-hand or valve carrying casing, it will be understood that when the parts illustrated in Figure 4 are in the position shown in said figure, the valve 15 is closed and no fluid can pass through the casing and the tube holder 3 until the valve is lifted from its seat, and this is not done until the tube 33 to be tested, see Figure 1, has been placed in position upon the guides in the two opposite tube holders and the left-hand tube holder 6 in the left-hand casing 5 has been forced forwardly or to the right by means later on explained, and such action moves the tube to be tested against the right-hand tube holder. This moves to the right the stem 24, spindle 21 and the valve 15 away from its seat 18 to admit the fluid under testing pressure from the source of fluid supply through the inlet 12, thence through the ports 19, the chamber 14, between the wings of the spindle 21, the chamber 20, the ports 24, the chamber 22 and the passage 25 into the tube 33 to be tested, exerting thereagainst a testing pressure which passes into the left-hand tube holder 6 and through its bore 37 into and out of the pressure outlet.

The left-hand casing and its adjuncts are especially illustrated in Figures 1, 2, 5 and 6 and the construction is the following:—

The left-hand casing 5 the counterpart of the right-hand casing 2 is in axial alignment with it and as already explained is carried by a supporting body 7 mounted upon the base 1.

This casing 5 is axially bored to receive the left tube holder 6 having a cylindric body at its inner face formed with a recessed head as at 34, the counterpart of the head 30 of the right-hand tube holder 3.

The tube holder 6 has a bore or passage 37 communicating with an aperture of the tube guide which is held in place in the head 34 and communicates with outlet tube 41.

At its outer end the tube holder 6 is confined against the outer end of the casing 5 by a tube holder nut 36 which limits the longitudinal movement of said tube holder 6 inwardly or toward the right, and permits of its movement outward or toward the left.

It being the function of the left-hand tube holder not only to serve in conformance with the right-hand tube holder to hold the tube in place, but also through the intervention of the tube when in place to force to the right within the right-hand casing 2, the right-hand tube holder 3, as already explained, by means provided for effecting such movement, and, although other means may be employed for the same purpose, I find the following balanced cranking device convenient for the purpose.

38 designates an annular groove in the tube holder 6 which forms a cylindric chamber in the casing 5. By extending said holder outwardly on each side there are formed bearings 42, for crank blocks or shoes 39 and 40 which travel longitudinally of said bearings within the casing 5 and respectively secure to them crank pins 43 and 44 which extend within segmental slots 45 and 46 formed in the lower portions 47 and 48 which constitute the bifurcated end of a crank arm 49 the head of which is designated 50.

The crank arm extends upwardly and rearwardly from a pivot 51 supported upon a bearing 52 formed upon or connected with the upper surface of the casing 5. At its outer end the crank arm is provided with a balanced weight 53.

From the foregoing construction it will be obvious that while the crank arm can be turned in either direction upon its pivot 51, it will cause the segmental slots 45 and 46 in its extended ends 47 and 48 to travel over the crank pins 43 and 44 and cause the blocks or shoes 39 and 40 to travel within the bearing slots 42 in the casing 5 to the limit of the length of said bearing slots which I define by the lines 54 and 55 in Figure 5. The capacity of the tube holder 6 to be rotated will not be affected although its end for end movement under the throw of the crank as already explained will remain unaffected.

The capacity for rotary movement of the two tube holders within their respective casings after the tube has been set in place is for the purpose of enabling the operator to inspect the tube upon all of its surfaces to determine the certainty of the test without having to remove the tube.

In order to test the pressure of the fluid and determine when the inlet valve 56 is to be turned off and the outlet valve 57 closed, I connect with the pressure inlet tube 58 a pressure gage 59 of any preferred type, as illustrated in Figure 15.

So far as the operation of my machine has not been already described in connection with the description of its components the operation is the following:—

Assuming the two tube holders and the casings within which they are respectively mounted to have been provided with the proper forms of tube guides to take hold of a tube of the form which it is desired to test, it is to be understood that after the adjustment of the respective casings to such a distance apart as will correspond to about the length of the tube to be tested and the adjustment of the right-hand casing and tube holder being performed and the adjustment of the left-hand casing and tube holder being such that the right-hand end of the tube can be entered within the right-hand tube guide, the left-hand tube guide will be adjusted sufficiently to the left of its casing to permit the slipping of the left-hand end of the tube into the left-hand tube holder and over the left-hand tube guide.

When the tube has been thus adjusted and held as to its left-hand end in alignment with the left-hand tube guide and tube holder, the crank is drawn forwardly with the result that through the travel of the crank pins 43 and 44 within the segment slots 45 and 46, the left-hand tube holder 6 will have been forced to the right and into the position shown in Figure 5 with the result first that the tube will be clamped tightly between the two tube holders its ends being forced against the packings 31 so as to be fluid tight, and second that in the act of clamping the tube in the foregoing position the right-hand tube holder will be forced to the right so as to open the valve within the casing 2 of said right-hand tube holder to admit testing fluid as air, steam or water under pressure into and throughout the entire interior of the tube 33 so as effectually to test said tube. The valve 57 is now closed.

When the pressure gage indicates that the desired pressure has been attained and the tube itself has been subjected to the desired maximum pressure, the operator will be enabled by effecting the rotary movement of both of the tube holders through the rotation of either one or both of the heads 30 and 34 to inspect all of the surfaces of the tube by such rotation, thus rendering it possible to determine any imperfection in the tube.

In order to effect the release of a tested tube the crank is lifted to occasion the left-hand or outward movement of the left-hand tube holder, with the result that the pressure is cut off, and the tube can be removed.

It will now be apparent that I have devised a novel and useful construction of a pipe and tube tester which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a tube testing machine, means to clamp a tube in testing position and permit its rotation on its own axis when in such position, and means operable to admit fluid under pressure to the tube by the clamping action.

2. In a tube testing machine, means to clamp a tube in testing position and permit its rotation on its own axis when in such position, means operable to admit fluid under pressure to the tube by the clamping action, and means for forming at the same time a fluid-tight joint.

3. A tube testing machine, comprising tube clamping means to hold the tube in testing position and permit its rotation on its own axis, and means actuated by said tube clamping means and in unison with the movement of said clamping means to control the admission of testing pressure to said tube.

4. A tube testing machine, comprising rotatably mounted clamping members to clamp against the ends of a tube, a manually actuated controlling member operatively connected with one of said clamping members to effect longitudinal movement of them, and a valve actuated by said clamping members when moved longitudinally to control admission of testing fluid under pressure to the tube.

5. A tube testing machine comprising clamping members rotatably mounted to clamp against the ends of a tube, tube guides on said members, a manually actuated controlling member operatively connected with one of said clamping members to effect longitudinal movement of them, and a valve actuated by said clamping members when moved longitudinally to control admission of testing pressure to the tube.

6. A tube testing machine of the character described, which comprises in combination—a base, a pair of oppositely disposed casings mounted and relatively adjustable upon said base—a pair of rotatable, oppositely-disposed and axially-aligned port-provided tube holders, respectively mounted in the casings and movable in said casings toward and from each other—a valve mechanism within one of said casings for occasioning the longitudinal movement of a tube holder mounted within it—and a source of fluid pressure supply to the tube holders and tube.

7. A tube testing machine of the character described, which comprises in combination—a base, a pair of oppositely-disposed casings mounted and relatively adjustable upon said base—means for securing said casings at desired positions upon said base—a pair of rotatable, oppositely-disposed, axially-aligned, port-provided tube holders, respectively mounted in the casings and reciprocable in said casings toward and from each other—a removable tube guide in each tube holder—a valve mechanism within one of said casings to admit or cut off a fluid pressure supply through the tube holder within said casing into or from the tube to be tested—a means applied to one of said casings for occasioning the longitudinal movement of a tube holder mounted within it—and a source of fluid pressure supply to the tube holders and tube.

8. In a tube testing machine in which are combined a base, a pair of oppositely disposed casings adjustable toward and from each other upon said carrying base, oppositely disposed port-provided tube holders respectively reciprocable within the casing, a valve mechanism within one of said casings, which comprises a valve chamber, a spring controlled valve, means of connection between the valve and the tube holder which the casing carries, and fluid ports for admitting a pressure fluid into the valve chamber and from out said chamber into and through the tube holder into the tube.

9. A tube testing machine of the character described, which comprises in combination—a base, a pair of oppositely-disposed casings mounted and relatively adjustable upon said base, means for securing said casings at desired positions upon said base—a pair of rotatable, oppositely-disposed, axially-aligned, port-provided tube holders, respectively mounted in the casings and reciprocable in said casings toward and from each other—a removable tube guide in each tube holder—a valve mechanism within one of said casings to admit or cut off a fluid pressure supply through the tube holder within said casing into or from the tube to be tested—a means comprising a balanced crank having a segmentally grooved lower end and a pivot-provided travelling block the pivots of which are entered within said segmental grooved lower end of said crank, and which block travels within a chamber formed within said tube holder, applied to one of said casings for occasioning the longitudinal movement of a tube holder mounted within it—and a source of fluid pressure supply to the tube holders and tube.

JOHN CHARLES BAREISS.

Witnesses:
J. Bonsall Taylor,
C. D. McVay.